(12) United States Patent
Kim et al.

(10) Patent No.: US 11,476,518 B2
(45) Date of Patent: Oct. 18, 2022

(54) BATTERY PACK

(71) Applicant: Samsung SDI Co., Ltd., Yongin-si (KR)

(72) Inventors: Junyoung Kim, Yongin-si (KR);
Seungwoo Yang, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 165 days.

(21) Appl. No.: 16/619,845

(22) PCT Filed: Jan. 4, 2018

(86) PCT No.: PCT/KR2018/000144
§ 371 (c)(1),
(2) Date: Dec. 5, 2019

(87) PCT Pub. No.: WO2018/225919
PCT Pub. Date: Dec. 13, 2018

(65) Prior Publication Data

US 2020/0161729 A1    May 21, 2020

(30) Foreign Application Priority Data

Jun. 7, 2017  (KR) .................. 10-2017-0070956

(51) Int. Cl.
*H01M 10/6557* (2014.01)
*H01M 10/613* (2014.01)
(Continued)

(52) U.S. Cl.
CPC ..... *H01M 10/6557* (2015.04); *H01M 10/613* (2015.04); *H01M 10/6552* (2015.04);
(Continued)

(58) Field of Classification Search
CPC ............ H01M 10/613; H01M 10/653; H01M 10/6552; H01M 10/6554; H01M 10/6556;
(Continued)

(56) References Cited

U.S. PATENT DOCUMENTS

| 8,298,699 B2 | 10/2012 | Nakamura |
| 9,246,200 B2 | 1/2016 | Kang |

(Continued)

FOREIGN PATENT DOCUMENTS

| CN | 101617434 | 12/2009 |
| CN | 102738538 | 10/2012 |

(Continued)

OTHER PUBLICATIONS

Extended European Search Report dated Feb. 9, 2021, issued in European Patent Application No. 18814005.7.
(Continued)

*Primary Examiner* — Lingwen R Zeng
(74) *Attorney, Agent, or Firm* — H.C. Park & Associates, PLC

(57) ABSTRACT

A battery pack includes: a plurality of battery modules each including a plurality of battery cells arranged side by side in a first direction; and a cooling mechanism having passages arranged adjacent to the plurality of battery modules to conduct a heat transfer medium to cool the plurality of battery modules, the cooling mechanism including: a plurality of inflow tubes arranged adjacent to a center line extending through centers of the plurality of battery modules in the first direction, the plurality of inflow tubes having first distal ends to receive heat transfer medium and second distal ends to discharge heat transfer medium; and a plurality of outflow tubes connected to the second distal ends of the plurality of inflow tubes to discharge heat transfer medium therefrom, the plurality of outflow tubes being disposed in a
(Continued)

position further outwardly from the center line than the plurality of inflow tubes.

16 Claims, 7 Drawing Sheets

(51) Int. Cl.
| | |
|---|---|
| *H01M 10/6552* | (2014.01) |
| *H01M 10/6569* | (2014.01) |
| *H01M 50/20* | (2021.01) |
| *H01M 10/6554* | (2014.01) |
| *H01M 10/653* | (2014.01) |
| *H01M 10/6556* | (2014.01) |
| *H01M 50/204* | (2021.01) |

(52) U.S. Cl.
CPC ....... *H01M 10/6569* (2015.04); *H01M 50/20* (2021.01); *H01M 10/653* (2015.04); *H01M 10/6554* (2015.04); *H01M 10/6556* (2015.04); *H01M 50/204* (2021.01); *H01M 2220/20* (2013.01); *Y02E 60/10* (2013.01)

(58) Field of Classification Search
CPC ......... H01M 10/6557; H01M 10/6569; H01M 2220/20; H01M 50/20; H01M 50/204; Y02E 60/10
See application file for complete search history.

(56) References Cited

U.S. PATENT DOCUMENTS

| | | | |
|---|---|---|---|
| 9,581,367 B2 | 2/2017 | Mann | |
| 9,605,914 B2 | 3/2017 | Yum et al. | |
| 9,627,724 B2 | 4/2017 | Yum et al. | |
| 9,647,251 B2 | 5/2017 | Prinz et al. | |
| 10,224,583 B2 | 3/2019 | Kim et al. | |
| 2010/0009248 A1* | 1/2010 | Fuhrmann | H01M 10/6555 429/120 |
| 2010/0055547 A1 | 3/2010 | Nakamura | |
| 2011/0045334 A1* | 2/2011 | Meintschel | H01M 50/20 429/120 |
| 2012/0183822 A1 | 7/2012 | Chung et al. | |
| 2013/0280596 A1 | 10/2013 | Lee et al. | |
| 2014/0013774 A1 | 1/2014 | Grunwald et al. | |
| 2014/0072845 A1 | 3/2014 | Oh et al. | |
| 2015/0099146 A1 | 4/2015 | Kim et al. | |
| 2016/0164148 A1 | 6/2016 | Yum et al. | |
| 2016/0222631 A1 | 8/2016 | Kohno et al. | |
| 2018/0123191 A1* | 5/2018 | Dudley | H01M 50/543 |
| 2018/0151929 A1* | 5/2018 | Song | H01M 50/20 |

FOREIGN PATENT DOCUMENTS

| | | |
|---|---|---|
| CN | 104247144 | 12/2014 |
| JP | 2013546150 | 12/2013 |
| JP | 2014-053276 | 3/2014 |
| JP | 2014053276 | 3/2014 |
| JP | 2015-141887 | 8/2015 |
| JP | 2017-062065 | 3/2017 |
| JP | 6542462 | 7/2019 |
| KR | 10-2012-0036742 | 4/2012 |
| KR | 10-2013-0112117 | 10/2013 |
| KR | 10-2013-0126159 | 11/2013 |
| KR | 10-2014-0110233 | 9/2014 |
| KR | 10-1443829 | 9/2014 |
| KR | 10-2014-0124064 | 10/2014 |
| KR | 10-1453780 | 10/2014 |
| KR | 10-2014-0138412 | 12/2014 |
| KR | 10-2015-0081516 | 7/2015 |
| KR | 10-2016-0065637 | 6/2016 |
| KR | 10-2016-0067711 | 6/2016 |
| WO | 2011021843 | 2/2011 |
| WO | 2017015826 | 2/2017 |

OTHER PUBLICATIONS

International Search Report dated Apr. 13, 2018, in International Application No. PCT/KR201 8/000144 (with English Translation).
Office Action dated Sep. 30, 2021 from the European Patent Office for European Patent Application No. 18814005.7.
International Search Report dated Apr. 13, 2018 in International Application No. PCT/KR2018/000144.
Notice of Allowance dated Dec. 28, 2021, issued to Korean Patent Application No. 10-2017-000070956.
Office Action dated May 5, 2022, issued to Chinese Patent Application No. 2018800327282.9.

* cited by examiner

BATTERY PACK

CROSS-REFERENCE TO RELATED APPLICATIONS

This application is a National Stage Entry of International Patent Application No. PCT/KR2018/000144, filed on Jan. 4, 2014, and claims priority from and the benefit of Korean Patent Application No. 10-2017-0070956, filed on Jun. 7, 2017, each of which is incorporated by reference for all purposes as if fully set forth herein.

BACKGROUND

Field

Exemplary embodiments of the invention relate to a battery pack, and more particularly, to a battery pack having improved heat exchange efficiency.

Discussion of the Background

In general, battery cells are used as energy sources for mobile devices, electric vehicles, hybrid vehicles, or other electric devices, and such battery cells may be modified according to the types of devices to which the battery cells are applied.

For example, small mobile devices such as cellular phones may be operated for a certain period of time by using the power and capacity of only one battery cell. However, a battery including high-capacity battery modules each formed by electrically connecting battery cells to increase power and capacity may be used for devices such as electric vehicles or hybrid vehicles consuming large amounts of power, having long operating times, and requiring high-power driving.

The output power or current of such a battery module may be adjusted by varying the number of battery cells of the battery module. In addition, such battery modules may be electrically connected to each other to form a battery pack.

In general, battery cells provide energy to external electronic devices while undergoing an electrochemical reaction. The battery cells generate heat during the electrochemical reaction, and when such heat accumulates, the battery cells may deteriorate and may, in severe cases, cause instability in the battery pack. Therefore, various studies have been conducted to control the temperature of battery cells.

The above-described background art is technical information that the inventors had or learned when or while deriving embodiments of the invention and may not have been publicly known before the filing of the present patent application.

SUMMARY

Battery packs constructed according to the principles and exemplary implementations of the invention are capable of uniformly cooling substantially the entire area of battery modules to improve battery pack safety.

In addition, battery packs constructed according to the principles and exemplary implementations of the invention are capable of improving the efficiency of a compressor that compresses a heat transfer medium used to cool battery modules of the battery pack.

Additional features of the inventive concepts will be set forth in the description which follows, and in part will be apparent from the description, or may be learned by practice of the inventive concepts.

According to one or more exemplary embodiments of the invention, a battery pack includes: a plurality of battery modules each including a plurality of battery cells, each of the plurality of battery modules arranged side by side in a first direction; and a cooling mechanism having passages arranged adjacent to the plurality of battery modules to conduct a heat transfer medium to cool the plurality of battery modules, the cooling mechanism including: a plurality of inflow tubes arranged adjacent to a center line extending through centers of the plurality of battery modules in the first direction, the plurality of inflow tubes having first distal ends to receive heat transfer medium and second distal ends to discharge heat transfer medium; and a plurality of outflow tubes connected to the second distal ends of the plurality of inflow tubes to discharge heat transfer medium therefrom, the plurality of outflow tubes being disposed in a position further outwardly from the center line than the plurality of inflow tubes.

In battery packs constructed according to exemplary embodiments of the invention, a portion of the cooling passage in which the heat transfer medium is superheated is arranged at low-temperature portions of the battery modules, and thus substantially the entire area of the battery modules may be cooled in a uniform manner.

In addition, in battery packs constructed according to exemplary embodiments of the invention, the cooling mechanism includes passages arranged in parallel, and thus the overall length of the cooling passages may be reduced to minimize the difference between the inflow pressure and outflow pressure of the heat transfer medium, and thus to improve the efficiency of a compressor used to compress the heat transfer medium.

It is to be understood that both the foregoing general description and the following detailed description are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
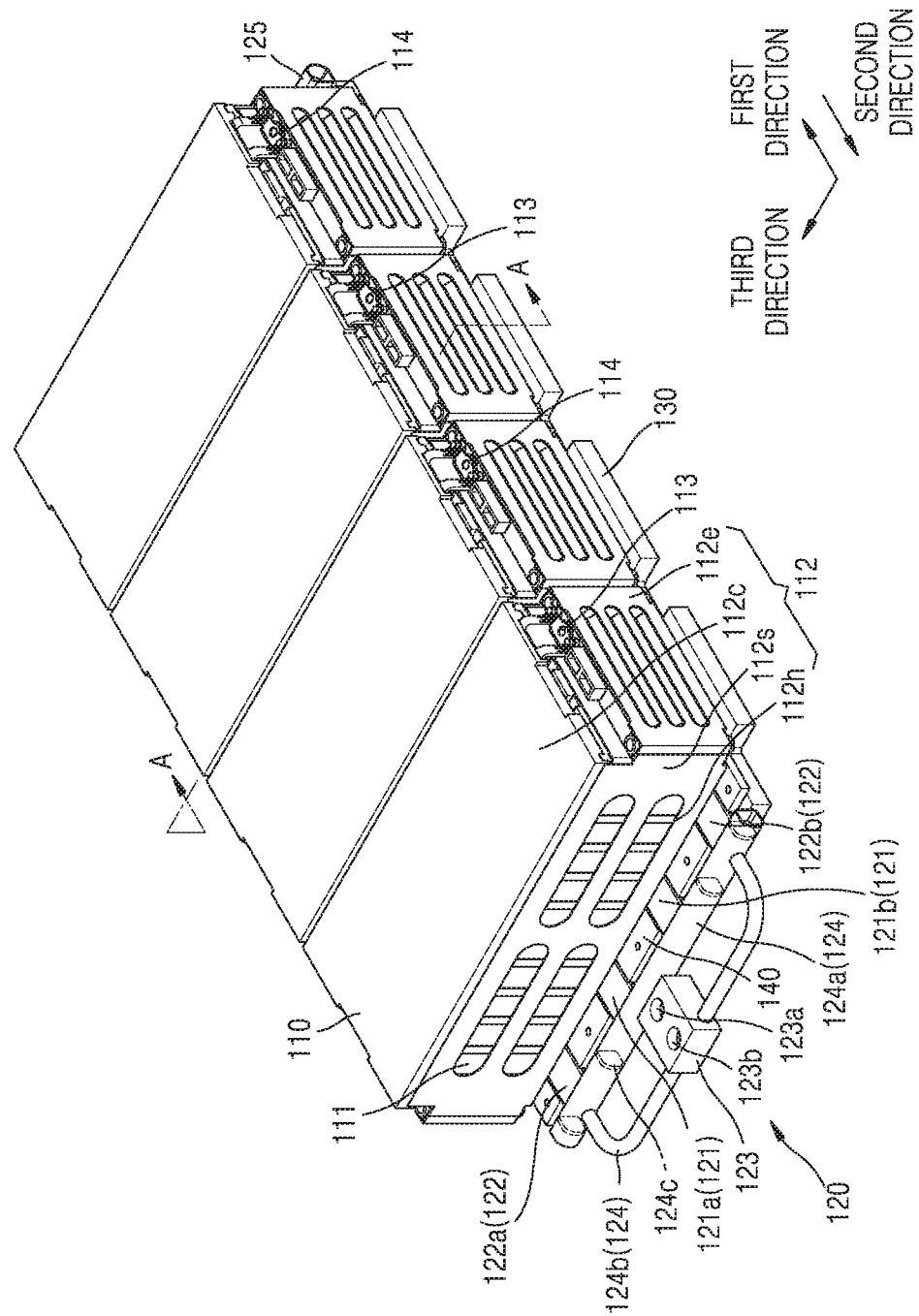
FIG. 1 is a perspective view illustrating an exemplary embodiment of a battery pack constructed according to the principles of the invention.

According to one or more exemplary embodiments of the invention, a battery pack includes: a plurality of battery modules each including a plurality of battery cells, each of the plurality of battery modules arranged side by side in a first direction; and a cooling mechanism having passages arranged adjacent to the plurality of battery modules to conduct a heat transfer medium to cool the plurality of battery modules, the cooling mechanism including: a plurality of inflow tubes arranged adjacent to a center line extending through centers of the plurality of battery modules in the first direction, the plurality of inflow tubes having first distal ends to receive heat transfer medium and second distal ends to discharge heat transfer medium; and a plurality of outflow tubes connected to the second distal ends of the plurality of inflow tubes to discharge heat transfer medium therefrom, the plurality of outflow tubes being disposed in a position further outwardly from the center line than the plurality of inflow tubes.

The cooling mechanism may be configured to: conduct the heat transfer medium in the first direction along the plurality of inflow tubes to sequentially cool the plurality of battery modules in the first direction; guide the heat transfer medium from the plurality of inflow tubes to the plurality of outflow tubes; and conduct the heat transfer medium in a second direction opposite to the first direction along the plurality of outflow tubes to sequentially cool the plurality of battery modules in the second direction.

The cooling mechanism may further include: a hub member including: an inlet to receive heat transfer medium; and an outlet to discharge heat transfer medium; a hub passage including: an inflow passage to guide the heat transfer medium from the inlet toward the plurality of inflow tubes; and an outflow passage to guide the heat transfer medium from the plurality of outflow tubes toward the outlet; and a turning passage connecting the second distal ends of the plurality of inflow tubes to the plurality of outflow tubes, the turning passage configured to separate-streams of the heat transfer medium flowing through the plurality of inflow tubes adjacent to the center line from each other.

The hub passage may further include a first barrier wall provided in the hub passage to isolate the inflow passage and the outflow passage from each other to isolate a stream of the heat transfer medium flowing in the inflow passage from mixing with a stream of the heat transfer medium flowing in the outflow passage from mixing.

The plurality of inflow tubes may include: a first sub-inflow tube disposed at a first side respect to the center line; and a second sub-inflow tube disposed at a second side opposite to the first side respect to the center line, wherein the plurality of outflow tubes may include: a first sub-outflow tube disposed at a first side respect to the center line; and a second sub-outflow tube disposed at a second side opposite to the first side respect to the center line, and wherein the turning passage may include: a first sub-turning passage connecting the first sub-inflow tube to the first sub-outflow tube; and a second sub-turning passage connecting the second sub-inflow tube to the second sub-outflow tube.

The turning passage may include an unitary piece extending in a third direction intersecting the first direction, the turning passage further including a second barrier wall to isolate a first sub-inflow tube from a second sub-inflow tube to isolate a stream of the heat transfer medium flowing in the first sub-inflow tube from mixing with a stream of the heat transfer medium flowing in the second sub-inflow tube.

The plurality of inflow tubes and the plurality of outflow tubes may be symmetrical with respect to the center line.

A gap between the first sub-inflow tube and the second sub-inflow tube may be less than a gap between the first sub-inflow tube and the first sub-outflow tube and a gap between the second sub-inflow tube and the second sub-outflow tube.

The battery pack may further include a support member to support the plurality of battery modules and the cooling mechanism, the support member including a recessed portion to receive the cooling mechanism.

The battery pack may further include an elastic member provided on the recessed portion between the cooling mechanism and the support member, the elastic member elastically supporting the cooling mechanism.

The battery pack may further include a thermally conductive plate arranged between the cooling mechanism and the plurality of battery modules to transfer heat generated in the plurality of battery modules to the cooling mechanism.

The battery pack may further include a buffer pad arranged between the thermally conductive plate and the plurality of battery modules to buffer and support a side of the plurality of battery modules.

The passages of the cooling mechanism may further includes a rib extending in at least one of the plurality of inflow and outflow tubes in the first direction to divide the at least one of the plurality of inflow and outflow tubes into a plurality of channels.

The battery pack may further include a heat transfer medium disposed in the passages.

The heat transfer medium may include a refrigerant capable of undergoing a phase change at room temperature.

The plurality of battery modules define first and second outer opposed ends and first and second outer lateral sides intersecting the opposed ends, the plurality of inflow tubes and the plurality of outflow tubes extending between the first and second opposed ends, with the outflow tubes being substantially parallel to the outer lateral sides of the plurality of battery modules.

The invention may be variously modified, and various exemplary embodiments may be provided according to the invention. Hereinafter, some exemplary embodiments will be illustrated in the accompanying drawings and described in detail. Effects and features of the invention, and implementation methods thereof will be clarified through the following exemplary embodiments described in detail with reference to the accompanying drawings. However, the invention is not limited to the following exemplary embodiments but may be implemented in various forms.

In the following exemplary embodiments, it will be understood that although terms such "first" and "second," are used to describe various elements, these elements should not be limited by these terms. These terms are only used to distinguish one element from another. The terms of a singular form may include plural forms unless referred to the contrary. In addition, terms such as "include" or "comprise" specify features or the presence of stated elements, but do not exclude other features or elements.

In the drawings, the sizes of elements may be exaggerated for clarity. For example, in the drawings, the size or thickness of each element may be arbitrarily shown for illustrative purposes, and thus the invention should not be construed as being limited thereto.

Hereinafter, exemplary embodiments of the invention will be described in detail with reference to the accompanying drawings. In the following description given with reference to the accompanying drawings, the same elements or corresponding elements are denoted with the same reference numerals, and overlapping descriptions thereof will be omitted.

Figure 2:
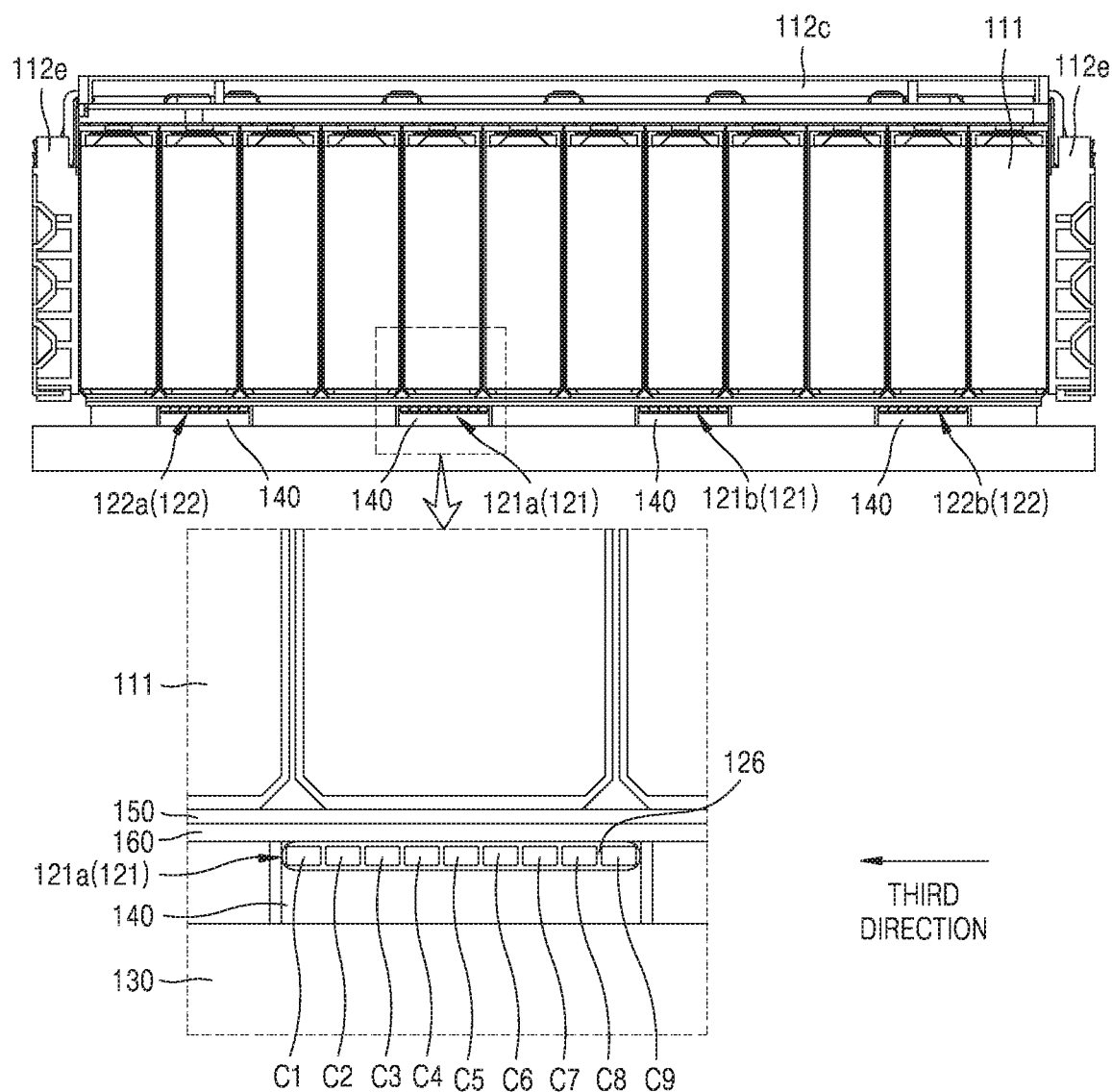
FIG. 2 is a cross-sectional view taken along line A-A of FIG. 1.
Figure 3:
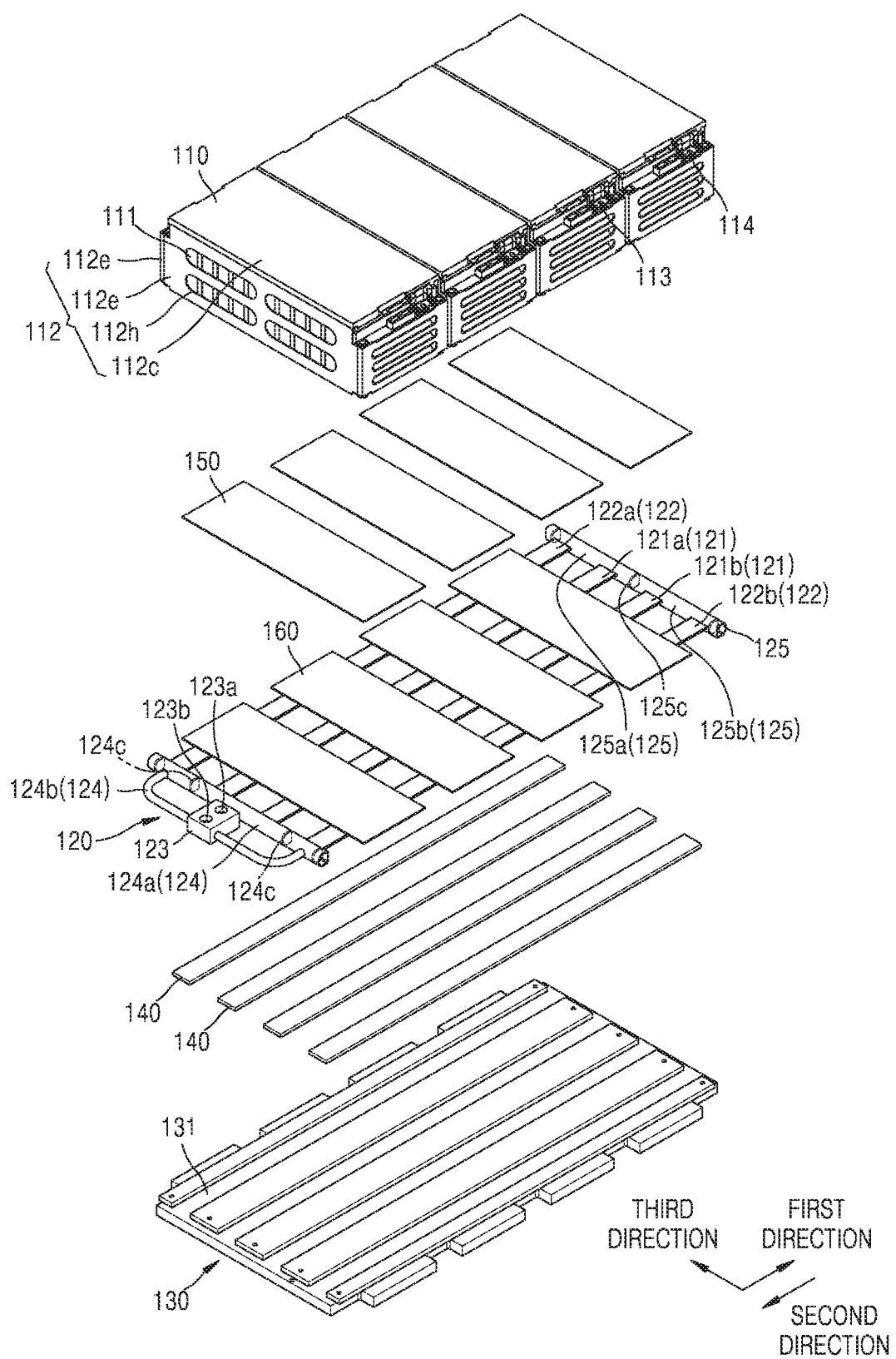
FIG. 3 is an exploded perspective view illustrating elements of the battery pack shown in FIG. 1.
Figure 4:
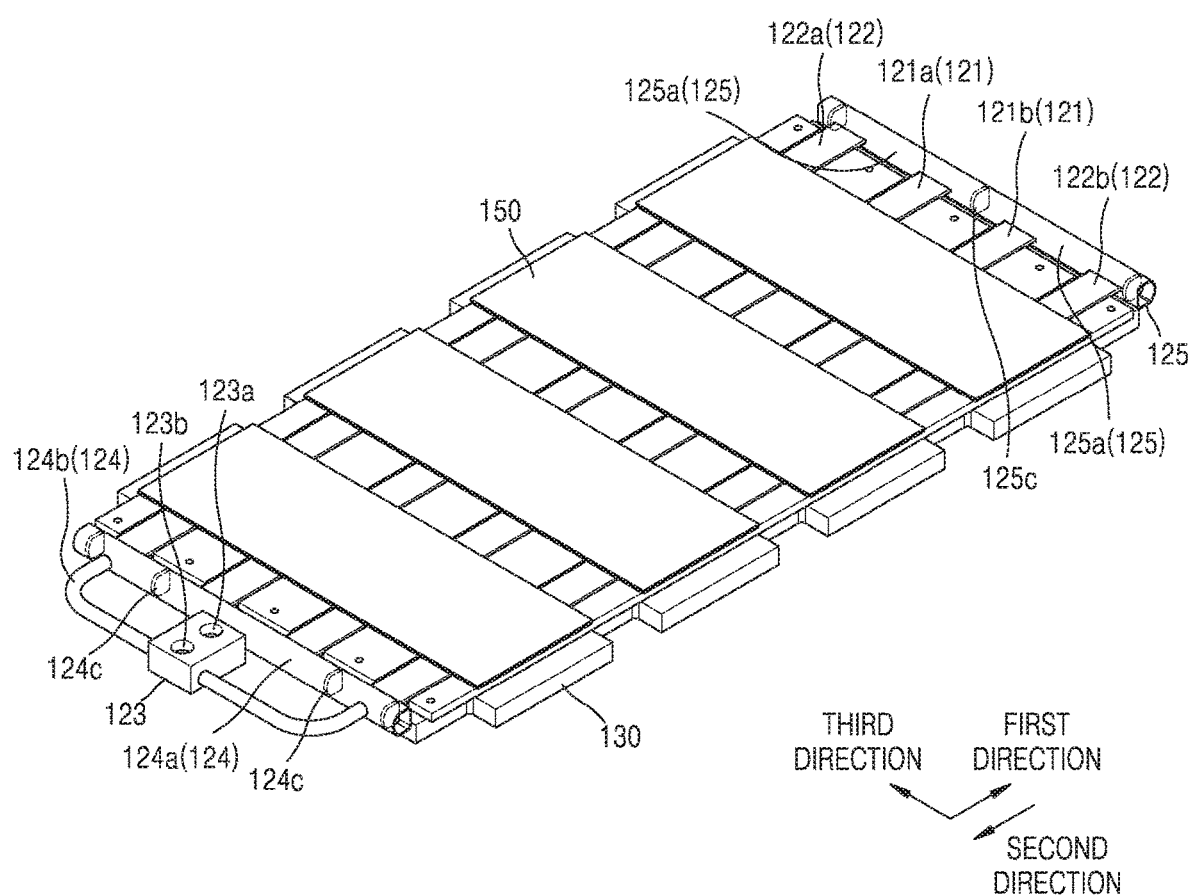
FIG. 4 is a partial perspective view illustrating an assembled state of some elements of the battery pack shown in FIG. 3.
Figure 5:
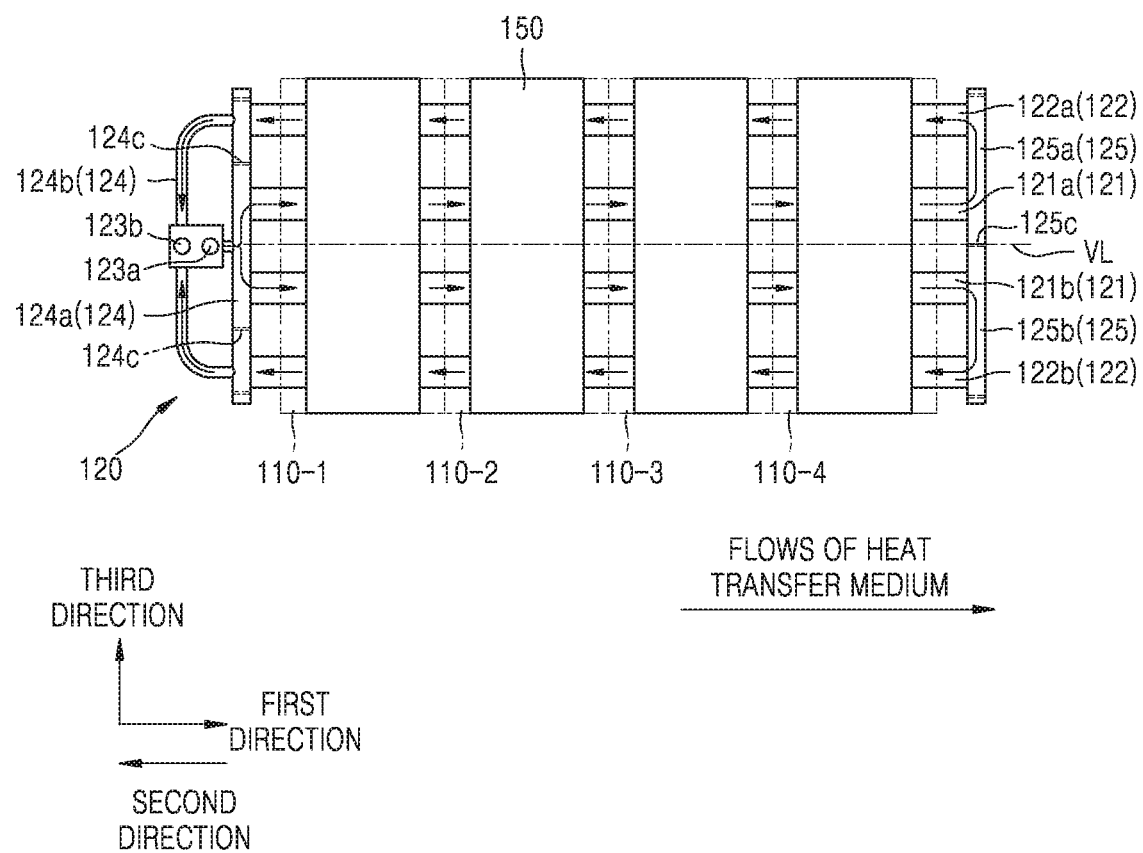
FIG. 5 is a plan view of the elements illustrated in FIG. 4 illustrating flows of a heat transfer medium in a cooling passage.
Figure 6:
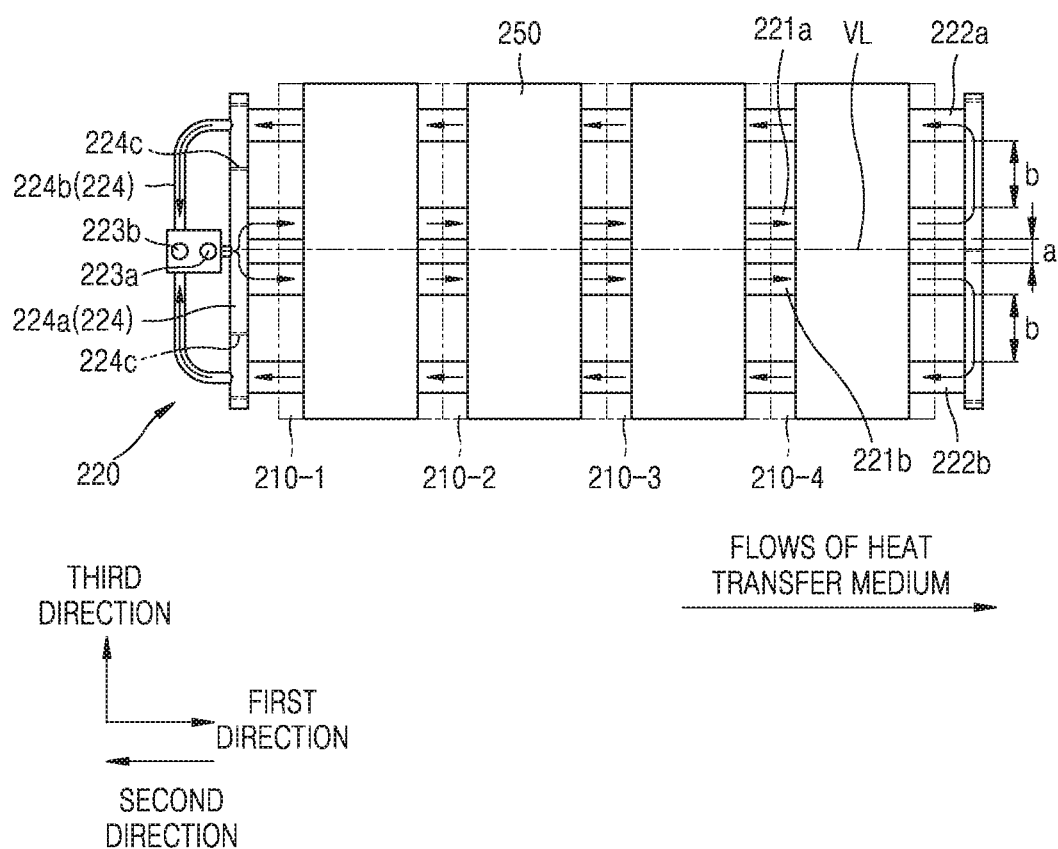
FIG. 6 is a plan view illustrating flows of a heat transfer medium in a cooling passage according to another embodiment of the cooling passage shown in FIG. 5.

FIG. 1 is a perspective view illustrating an exemplary embodiment of a battery pack constructed according to the principles of the invention; FIG. 2 is a cross-sectional view taken along line A-A of FIG. 1; FIG. 3 is an exploded perspective view illustrating elements of the battery pack shown in FIG. 1; FIG. 4 is a partial perspective view illustrating an assembled state of some elements of the battery pack shown in FIG. 3; FIG. 5 is a plan view of the elements illustrated in FIG. 4 illustrating flows of a heat transfer medium in a cooling passage; and FIG. 6 is a plan view illustrating flows of a heat transfer medium in a cooling passage according to another embodiment of the cooling passage shown in FIG. 5.

First, referring to FIGS. 1, 2, and 3, the battery pack of the embodiment of the invention may include a battery module 110, a cooling passage (or cooling mechanism having passages) 120, a support member 130, elastic members 140, a thermally conductive plate 160, and a buffer pad 150.

First, the battery module 110 may be a high-voltage, high-capacity battery module including a plurality of battery cells 111 electrically connected to each other. For example, as shown in FIG. 1, the battery cells 111 included in the battery module 110 may be arranged side by side in a third direction. However, exemplary embodiments of the invention are not limited thereto. That is, the battery cells 111 may be arranged side by side in a first direction. However, for ease of description, the structure in which the battery cells 111 are arranged in the third direction will be mainly described.

In addition, a plurality of battery modules 110 may be provided, and in this case, the battery modules 110 may be arranged side by side in the first direction (or a second direction). The first direction is a direction in which the heat transfer medium mainly flows in the cooling passage 120 (as described later, the heat transfer medium may also flow in the third direction through a turning passage 125 in addition to flowing in the first direction). For example, although FIG. 1 illustrates four battery modules 110 arranged in the first direction, exemplary embodiments of the invention are not limited to the illustrated number of battery modules 110. That is, a plurality of battery modules 110 may be provided.

In addition, each of the battery modules 110 may further include a housing 112 that covers and seals the battery cells 111. Here, the housing 112 may include opening holes 112h to open portions of lateral and front sides of the battery cells 111 such that heat generated in the battery cells 111 may be dissipated to the outside. The opening holes 112h shown in the drawings have a rectangular shape with curved corners, but exemplary embodiments of the invention are not limited thereto. As described above, the opening holes 112h are for smoothly dissipating heat generated in the battery cells 111 to the outside, and to this end, the opening holes 112h may be formed in any shapes at any positions of the housing 112. For example, opening holes 112h may also be formed in an upper side of the housing 112.

In detail, the housing 112 may include: a pair of end housings 112e facing wide sides of the battery cells 111; a pair of side housings 112s connected to the end housings 112e and facing lateral sides of the battery cells 111; and a cover housing 112c facing an upper side of the battery cells 111. The end housings 112e, the side housings 112s, and the cover housing 112c are for fixing the battery cells 111 to form the battery module 110, and may be variously shaped according to the design of the battery module 110.

Each of the battery cells 111 may have a general structure including an electrode assembly in which a positive electrode plate and a negative electrode plate are arranged at both sides of a separator, and may be charged with a preset amount of electricity and may be discharged. In addition, a first terminal and a second terminal may protrude from a side of each of the battery cells 111 at a given distance therebetween.

The first terminal and the second terminal of a battery cell 111 may be electrically connected to the first terminal and the second terminal of an adjacent battery cell 111 via a bus bar. Here, the first terminal and the second terminal may have a positive polarity and a negative polarity, respectively.

The first terminals and the second terminals electrically connected through bus bars as described above may be configured as a positive terminal 113 or a negative terminal 114 of the battery module 110 as shown in the drawings and may be exposed to the outside of the housing 112. The positive and negative terminals 113 and 114 of the battery modules 110 may be electrically connected to each other through bus bars that connect the battery modules 110.

Next, the cooling passage 120 may include a plurality of inflow tubes 121, a plurality of outflow tubes 122, a hub member 123, a hub passage 124, a turning passage 125, and ribs 126.

The cooling passage 120 may be arranged adjacent to the battery modules 110 to cool the battery modules 110 using the heat transfer medium flowing in the cooling passage 120. Herein, the heat transfer medium may be a refrigerant capable of undergoing a phase change at room temperature and may include, for example, a CFC-based refrigerant such as R134a and R1234YF, and Novec. Any refrigerant, which is considered as being optimal for cooling the battery modules 110 in terms of physical factors such as the capacity and size of the battery pack and thermodynamic factors such as heat generated in the battery pack, may be selected as the heat transfer medium.

In addition, although FIG. 1 illustrates that the cooling passage 120 is provided on lower sides of the battery modules 110, exemplary embodiments of the invention are not limited thereto. For example, cooling passages 120 may also be provided on lateral sides and upper sides of the battery modules 110 based on the directions shown in the drawings. In this case, however, the housings 112, the positive terminals 113, the negative terminals 114, and the bus bars, which are main components when joining the battery cells 111 to each other, may be distant from the cooling passage 120 as shown in FIG. 1. For ease of description, the following description will be given based on the structure in which the cooling passage 120 is provided on the lower sides of the battery modules 110 as shown in FIG. 1.

The inflow tubes 121 may be arranged adjacent to a an imaginary line that constitutes a center line VL passing through the centers of the battery modules 110 in the first direction and may provide paths through which the heat transfer medium flows is introduced. In addition, the outflow tubes 122 may be arranged adjacent to the lateral sides of the battery modules 110 based on the first direction and may provide paths through which the heat transfer medium flows outward.

Hereinafter, the structures of the inflow tubes 121 and the outflow tubes 122 will be described in detail with reference to FIGS. 5 and 6.

First, Referring to FIG. 5, along the center line VL, the inflow tubes 121 may be provided as a pair, and the outflow tubes 122 may also be provided as a pair. In this case, an inflow tube 121a provided on a side of the center line VL and the other inflow tube 121b provided on the opposite side of the center line VL may be arranged to be symmetrical to each other. In addition, an outflow tube 122*a* provided on a side of the center line VL and the other outflow tube 122*b* provided on the opposite side of the center line VL may be arranged to be symmetrical to each other. In this case, the inflow tubes 121 may be adjacent to the center line VL than the outflow tubes 122 are to the center line VL, and the outflow tubes 122 may be more distant from the center line VL than the inflow tubes 121 are from the center line VL, that is, closer to the lateral sides of the battery modules 110.

Hereinafter, the inflow tube 121*a* and the outflow tube 122*a* provided on the side of the center line VL will be referred to as a first sub-inflow tube 121*a* and a first sub-outflow tube 122*a*, respectively, and the other inflow tube 121*b* and the other outflow tube 122*b* provided on the opposite side of the center line VL will be referred to as a second sub-inflow tube 121*b* and a second sub-outflow tube 122*b*, respectively.

In detail, as shown in FIG. 5, the gap between the first sub-inflow tube 121*a* and the first sub-outflow tube 122*a*, the gap between the first sub-inflow tube 121*a* and the second sub-inflow tube 121*b*, and the gap between the second sub-inflow tube 121*b* and the second sub-outflow tube 122*b* may correspond to each other. That is, the inflow tubes 121 and the outflow tubes 122 may be arranged at regular intervals.

In addition, FIG. 6 is a view illustrating another embodiment of the inflow tubes 121 and the outflow tubes 122 shown in FIG. 5. Referring to FIG. 6, the gap (a) between a first sub-inflow tube 221*a* and a second sub-inflow tube 221*b* may be less than the gap (b) between the first sub-inflow tube 221*a* and a first sub-outflow tube 222*a* and the gap (b) between the second sub-inflow tube 221*b* and a second sub-outflow tube 222*b*.

As described above, the gap (a) between the first sub-inflow tube 221*a* and the second sub-inflow tube 221*b* may be adjusted to be less than the gap (b) between the first sub-inflow tube 221*a* and the first sub-outflow tube 222*a* and the gap (b) between the second sub-inflow tube 221*b* and the second sub-outflow tube 222*b* because center portions of the battery modules 110 adjacent to the center line VL generally have a higher temperature than the lateral sides of the battery modules 110. The effect obtainable when the inflow tubes 121 and 221 and the outflow tubes 122 and 222 shown in FIGS. 5 and 6 have such a structure will be described later in detail with reference to FIG. 7.

In addition, the heat transfer medium flows as follows. As shown in FIG. 5, the heat transfer medium introduced into the cooling passage 120 may cool the battery modules 110 sequentially in the first direction (in the order of battery modules 110-1, 110-2, 110-3, and 110-4) while flowing along the inflow tubes 121. In detail, the heat transfer medium may flow in the first direction along the first sub-inflow tube 121*a* and the second sub-inflow tube 121*b* adjacent to the center line VL.

After the heat transfer medium flows along the first sub-inflow tube 121*a* and the second sub-inflow tube 121*b* and reaches the furthest downstream sides of the inflow tubes 121, the heat transfer medium may be guided from the inflow tubes 121 to the outflow tubes 122, and then, while flowing along the outflow tubes 122 in the second direction opposite to the first direction, the heat transfer medium may sequentially cool the battery modules 110 (in the order of battery modules 110-4, 110-3, 110-2, and 110-1).

The structure of the cooling passage 120 will now be described in more detail.

The cooling passage 120 may further include the hub member 123 including an inlet 123*a* through which the heat transfer medium is introduced and an outlet 123*b* through which the heat transfer medium is discharged.

In detail, among a compressor, a condenser, an expansion valve, and an evaporator forming a general refrigeration cycle, the cooling passage 120 may correspond to the evaporator. In this case, the inlet 123*a* may be connected downstream of the expansion valve through a heat transfer medium tube, and the outlet 123*b* may be connected upstream of the compressor through a heat transfer medium tube.

In this structure, the heat transfer medium may be introduced into the cooling passage 120 through the inlet 123*a* in a low-temperature, low-pressure liquid state after passing through the expansion valve, and may then evaporate by absorbing heat from the battery modules 110 while flowing along the cooling passage 120. The flow characteristics of the heat transfer medium will be described in detail with reference to FIG. 7.

That is, the hub member 123 may serve as a passage for delivering the heat transfer medium to the cooling passage 120, and specifically, the hub member 123 may also control the flow rate of the heat transfer medium flowing into the cooling passage 120. That is, the hub member 123 may be electrically connected to a controller that includes hardware having a microprocessor and an electric circuit and software for driving the hardware, and the controller may control the opening and closing of the inlet 123*a* and the outlet 123*b* and the degree of opening of the inlet 123*a* and the outlet 123*b*.

In addition, the cooling passage 120 may further include a hub passage 124, and the hub passage 124 may include an inflow passage 124*a* configured to guide the heat transfer medium from the inlet 123*a* toward the inflow tubes 121 and an outflow passage 124*b* configured to guide the heat transfer medium from the outflow tubes 122 toward the outlet 123*b*.

In addition, the hub passage 124 may further include first barrier walls 124*c* provided therein to isolate the inflow passage 124*a* and the outflow passage 124*b* from each other for preventing or isolating streams of the heat transfer medium flowing in the inflow passage 124*a* and streams of the heat transfer medium flowing in the outflow passage 124*b* from mixing with each other. That is, the first barrier walls 124*c* may physically isolate inner spaces of the inflow passage 124*a* and the outflow passage 124*b* from each other to prevent or isolate streams of the heat transfer medium introduced into the furthest upstream sides of the inflow tubes 121 from mixing with streams of the heat transfer medium flowing through the furthest downstream sides of the outflow tubes 122.

In addition, the cooling passage 120 may further include the turning passage 125 connecting the furthest downstream sides of the inflow tubes 121 and the furthest upstream sides of the outflow tubes 122 to each other while preventing or isolating the heat transfer medium from flowing between the inflow tubes 121 that are adjacent to the center line VL.

In detail, the turning passage 125 may include: a first sub-turning passage 125*a* through which the first sub-inflow tube 121*a* of the inflow tubes 121 arranged at a side of the center line VL is connected to the first sub-outflow tube 122*a* of the outflow tubes 122 arranged at the side of the center line VL; and a second sub-turning passage 125*b* through which the second sub-inflow tube 121*b* of the inflow tubes 121 arranged at the other side (opposite side) of the center line VL is connected to the second sub-outflow tube 122*b* of the outflow tubes 122 arranged at the other side of the center line VL.

Figure 7:
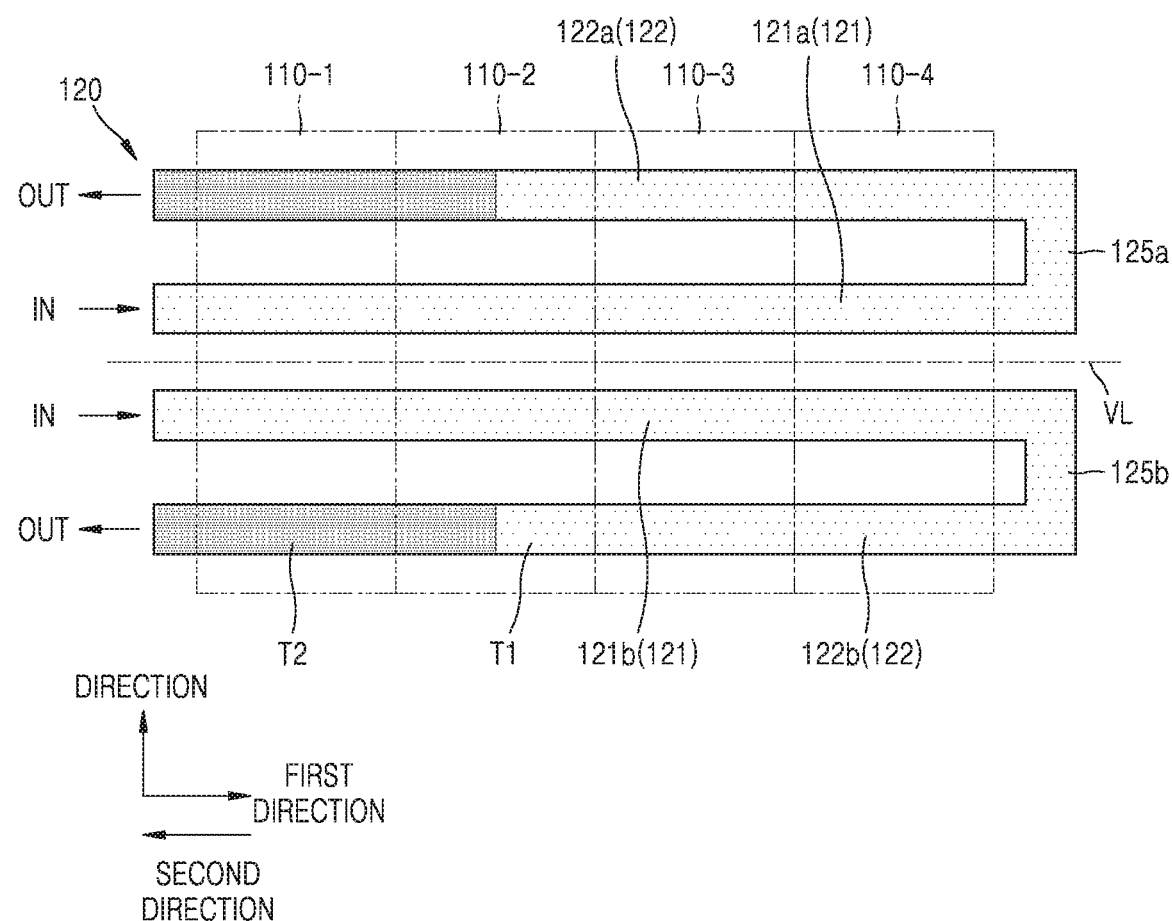
FIG. 7 is a schematic view illustrating variations in the temperature of a heat transfer medium flowing in a cooling passage constructed according to the principles of the invention.

Here, for example, as shown in FIG. 5, the first sub-turning passage 125a and the second sub-turning passage 125b may be formed in one piece. However, exemplary embodiments of the invention are not limited thereto. For example, as schematically shown in FIG. 7, the first sub-turning passage 125a and the second sub-turning passage 125b may be separate from each other as independent elements respectively connecting the first sub-inflow tube 121a to the first sub-outflow tube 122a, and the second sub-inflow tube 121b to the second sub-outflow tube 122b.

However, for ease of description, the following description will be given mainly based on the case in which the first sub-turning passage 125a and the second sub-turning passage 125b of the turning passage 125 are formed in one piece as shown in FIG. 5.

As shown in FIG. 5, the first sub-turning passage 125a and the second sub-turning passage 125b of the turning passage 125 may be formed in one piece in the third direction crossing the first and second directions.

In this case, the turning passage 125 may further include a second barrier wall 125c provided therein to isolate the first sub-inflow tube 121a and the second sub-inflow tube 121b from each other such that a stream of the heat transfer medium flowing along the first sub-inflow tube 121a and reaching the furthest downstream side of the first sub-inflow tube 121a may not mix with a stream of the heat transfer medium flowing along the second sub-inflow tube 121b and reaching the furthest downstream side of the second sub-inflow tube 121b.

As described above, since the second barrier wall 125c is provided in the turning passage 125, the heat transfer medium passing through the furthest downstream side of the first sub-inflow tube 121a may turn toward the furthest upstream side of the first sub-outflow tube 122a along the first sub-turning passage 125a. Similarly, since the second barrier wall 125c is provided in the turning passage 125 formed in one-piece, the heat transfer medium passing through the furthest downstream side of the second sub-inflow tube 121b may turn toward the furthest upstream side of the second sub-outflow tube 122b along the second sub-turning passage 125b.

Referring again to FIG. 2, the cooling passage 120 may further include the ribs 126 which extend in the cooling passage 120 in the first direction to divide the path of the heat transfer medium into a plurality of channels C1, C2, C3, C4, C5, C6, C7, C8, and C9.

That is, the ribs 126 may be formed in the inflow tubes 121 and the outflow tubes 122 in the first direction in which the inflow tubes 121 and the outflow tubes 122 extend, to divide the inside of each of the inflow tubes 121 and the outflow tubes 122 into the plurality of channels C1, C2, C3, C4, C5, C6, C7, C8, and C9.

The support member 130 may support the battery modules 110 and the cooling passage 120 and may include a recessed portion 131 for receiving the cooling passage 120. That is, as shown in the drawings, the support member 130 is a basic skeleton that supports all components of the battery pack.

The recessed portion 131 is formed by recessing, at predetermined intervals, a contact surface of the support member 130 with the cooling passage 120, and the elastic members 140 may be provided in the recessed portion 131.

That is, the elastic members 140 may be arranged between the cooling passage 120 and the support member 130 to elastically support the cooling passage 120. In detail, the elastic members 140 are for improving contact between the cooling passage 120 and the support member 130, and may have the same width as the cooling passage 120 such that the cooling passage 120 may be stably arranged at the support member 130.

Buffer pads 150 may be arranged between the battery modules 110 and thermally conductive plates 160 to buffer and support sides of the battery modules 110, that is, the lower sides of the battery cells 111 as shown in FIG. 2. For example, the buffer pads 150 may be formed of a silicone-based material to minimize a tolerance between the battery modules 110 and the thermally conductive plates 160.

The thermally conductive plates 160 may be arranged between the battery modules 110 and the cooling passage 120 to transfer heat generated from the battery modules 110 to the cooling passage 120. That is, the thermally conductive plates 160 may prevent or isolate direct contact between the battery modules 110 and the cooling passage 120 to protect the opposing surfaces of the battery modules 110 and the cooling passage 120. In detail, the thermally conductive plates 160 may be arranged between the cooling passage 120 and the buffer pads 150 supporting the battery modules 110 to mechanically connect the cooling passage 120 and the buffer pads 150 to each other.

Hereinafter, the cooling operation of the cooling passage 120 of the battery pack described above according to the exemplary embodiments of the invention will be described in more detail with reference to FIG. 7.

FIG. 7 is a schematic view illustrating variations in the temperature of the heat transfer medium flowing in the cooling passage 120 constructed according to the principles of the invention.

Referring to FIG. 7, the heat transfer medium introduced into the inflow tubes 121 may cool the center portions of the battery modules 110 adjacent to the center line VL while flowing in the first direction along the first sub-inflow tube 121a and the second sub-inflow tube 121b, and may then flow to the outflow tubes 122 through the turning passage 125. After flowing from the turning passage 125 to the outflow tubes 122, the heat transfer medium may cool the lateral sides of the battery modules 110 while flowing in the second direction along the first sub-outflow tube 122a and the second sub-outflow tube 122b.

As described above, the heat transfer medium may absorb heat generated in the battery modules 110 while flowing through the cooling passage 120, and may thus undergo a phase change at a certain temperature. After the evaporation of the heat transfer medium fully occurs, the heat transfer medium may be superheated while the temperature of the heat transfer medium is rapidly increased. Referring to the temperature distribution of the heat transfer medium shown in FIG. 7 by considering the above-described characteristics, when the temperature of the heat transfer medium introduced into the inflow tubes 121 is defined as T1, and the temperature of the heat transfer medium flowing out of the outflow tubes 122 is defined as T2, T2 may be higher than T1. That is, the heat transfer medium introduced into the cooling passage 120 may initially undergo a phase change at the constant temperature T1, and may sufficiently evaporate at a position adjacent to the outlet 123b (refer to FIG. 5) and may then be superheated while the temperature of the heat transfer medium is rapidly increased to the temperature T2 higher than the temperature T1.

In addition, when the battery cells 111 are arranged side by side in the battery modules 110, the temperature of the battery modules 110 may be highest at the center portions of the battery modules 110 and lowest at the lateral sides of the battery modules 110. The reason for this is as follows. Central battery cells 111 exchange heat with adjacent battery cells 111, and each lateral battery cell 111 is in not contact with another battery cell 111 at one side thereof. Thus, heat may not be smoothly dissipated from the central battery cells 111 to the outside while the central battery cells 111 exchange heat with each other, but heat may be naturally dissipated from the lateral battery cells 111 to the outside by natural convection because the lateral battery cells 111 are exposed to the outside through the opening holes 112h formed in the housings 112.

As described above, the temperature of the battery modules 110 each including the battery cells 111 is structurally higher at the center portions of the battery modules 110 than at the lateral sides of the battery modules 110. Therefore, in the exemplary embodiments of the invention, the first sub-inflow tube 121a and the second sub-inflow tube 121b are arranged at positions adjacent to the center line VL passing through the centers of the battery modules 110 in the first direction, and the first sub-outflow tube 122a and the second sub-outflow tube 122b are arranged at positions adjacent to the lateral sides of the battery modules 110. Then, the center portions of the battery modules 110 having a relatively high temperature may be cooled by the heat transfer medium having the relatively low temperature T1, and the lateral sides of the battery modules 110 having a relatively low temperature may be cooled by the heat transfer medium having the relatively high temperature T2. Therefore, the effect of uniformly cooling the entire regions of the battery modules 110 may be maximized.

In addition, referring to FIG. 7, the cooling passage 120 has a parallel structure including two sub-inflow tubes 121a and 121b, and two sub-outflow tubes 122a and 122b. In this case, the overall length of the cooling passage 120 may be reduced compared to the case in which the cooling passage 120 has a series structure. According to this structure, the difference between the pressure of the heat transfer medium when the heat transfer medium is introduced into the cooling passage 120 and the pressure of the heat transfer medium when the heat transfer medium is discharge from the cooling passage 120 may be maintained at a low value, and thus the efficiency of the compressor that compresses the heat transfer medium may be improved.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

The invention claimed is:

1. A battery pack comprising:
a plurality of battery modules sequentially arranged in a first direction, each battery module comprising a plurality of battery cells and a housing covering the plurality of battery cells; and
a cooling mechanism having passages arranged adjacent to the plurality of battery modules to conduct a heat transfer medium to cool the plurality of battery modules, the cooling mechanism comprising:
a plurality of inflow tubes arranged adjacent to a center line extending through centers of the plurality of battery modules in the first direction, the plurality of inflow tubes having first distal ends to receive heat transfer medium and second distal ends to discharge heat transfer medium; and
a plurality of outflow tubes connected to the second distal ends of the plurality of inflow tubes to discharge heat transfer medium therefrom, the plurality of outflow tubes being disposed in a position further outwardly from the center line than the plurality of inflow tubes,
wherein the plurality of inflow tubes and the plurality of outflow tubes have different flowing directions, and are disposed under each battery module.

2. The battery pack of claim 1, wherein the cooling mechanism is configured to:
conduct the heat transfer medium in the first direction along the plurality of inflow tubes to sequentially cool the plurality of battery modules in the first direction;
guide the heat transfer medium from the plurality of inflow tubes to the plurality of outflow tubes; and
conduct the heat transfer medium in a second direction opposite to the first direction along the plurality of outflow tubes to sequentially cool the plurality of battery modules in the second direction.

3. The battery pack of claim 1, wherein the cooling mechanism further comprises:
a hub member comprising:
an inlet to receive heat transfer medium; and
an outlet to discharge heat transfer medium;
a hub passage comprising:
an inflow passage to guide the heat transfer medium from the inlet toward the plurality of inflow tubes; and
an outflow passage to guide the heat transfer medium from the plurality of outflow tubes toward the outlet; and
a turning passage connecting the second distal ends of the plurality of inflow tubes to the plurality of outflow tubes, the turning passage configured to separate streams of the heat transfer medium flowing through the plurality of inflow tubes adjacent to the center line from each other.

4. The battery pack of claim 3, wherein the hub passage further comprises a first barrier wall provided in the hub passage to isolate the inflow passage and the outflow passage from each other to isolate a stream of the heat transfer medium flowing in the inflow passage from mixing with a stream of the heat transfer medium flowing in the outflow passage from mixing.

5. The battery pack of claim 3, wherein the plurality of inflow tubes comprise:
a first sub-inflow tube disposed at a first side respect to the center line; and
a second sub-inflow tube disposed at a second side opposite to the first side respect to the center line,
wherein the plurality of outflow tubes comprises:
a first sub-outflow tube disposed at a first side respect to the center line; and
a second sub-outflow tube disposed at a second side opposite to the first side respect to the center line, and
wherein the turning passage comprises:
a first sub-turning passage connecting the first sub-inflow tube to the first sub-outflow tube; and
a second sub-turning passage connecting the second sub-inflow tube to the second sub-outflow tube.

6. The battery pack of claim 5, wherein the turning passage comprises a unitary piece extending in a third direction intersecting the first direction, the turning passage further comprising a second barrier wall to isolate a first sub-inflow tube from a second sub-inflow tube to isolate a stream of the heat transfer medium flowing in the first sub-inflow tube from mixing with a stream of the heat transfer medium flowing in the second sub-inflow tube.

7. The battery pack of claim 3, wherein the plurality of inflow tubes and the plurality of outflow tubes are symmetrical with respect to the center line.

8. The battery pack of claim 5, wherein a gap between the first sub-inflow tube and the second sub-inflow tube is less than a gap between the first sub-inflow tube and the first sub-outflow tube and a gap between the second sub-inflow tube and the second sub-outflow tube.

9. The battery pack of claim 1, further comprising a support member to support the plurality of battery modules and the cooling mechanism, the support member comprising a recessed portion to receive the cooling mechanism.

10. The battery pack of claim 9, further comprising an elastic member provided on the recessed portion between the cooling mechanism and the support member, the elastic member elastically supporting the cooling mechanism.

11. The battery pack of claim 1, further comprising a thermally conductive plate arranged between the cooling mechanism and the plurality of battery modules to transfer heat generated in the plurality of battery modules to the cooling mechanism.

12. The battery pack of claim 11, further comprising a buffer pad arranged between the thermally conductive plate and the plurality of battery modules to buffer and support a side of the plurality of battery modules.

13. The battery pack of claim 1, wherein the passages of the cooling mechanism further comprise a rib extending in at least one of the plurality of inflow tubes and the plurality of outflow tubes in the first direction to divide the at least one of the plurality of inflow tubes and the plurality of outflow tubes into a plurality of channels.

14. The battery pack of claim 1, further comprising a heat transfer medium disposed in the passages.

15. The battery pack of claim 14, wherein the heat transfer medium comprises a refrigerant capable of undergoing a phase change at room temperature.

16. The battery pack of claim 1, wherein the plurality of battery modules define first and second outer opposed ends and first and second outer lateral sides intersecting the first and second outer opposed ends, the plurality of inflow tubes and the plurality of outflow tubes extending between the first and second outer opposed ends, the plurality of outflow tubes being substantially parallel to the first and second outer lateral sides of the plurality of battery modules.

* * * * *